UNITED STATES PATENT OFFICE.

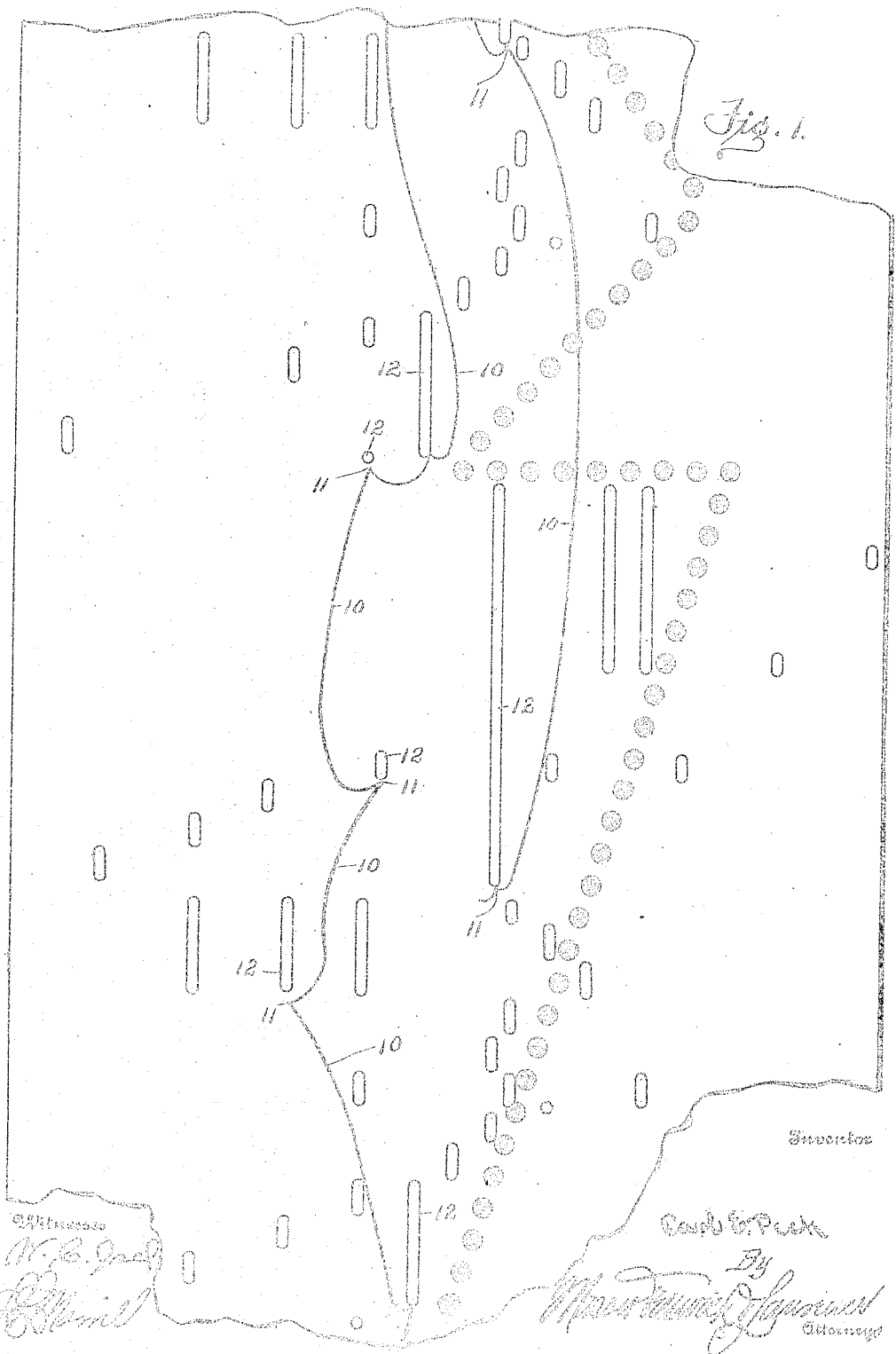

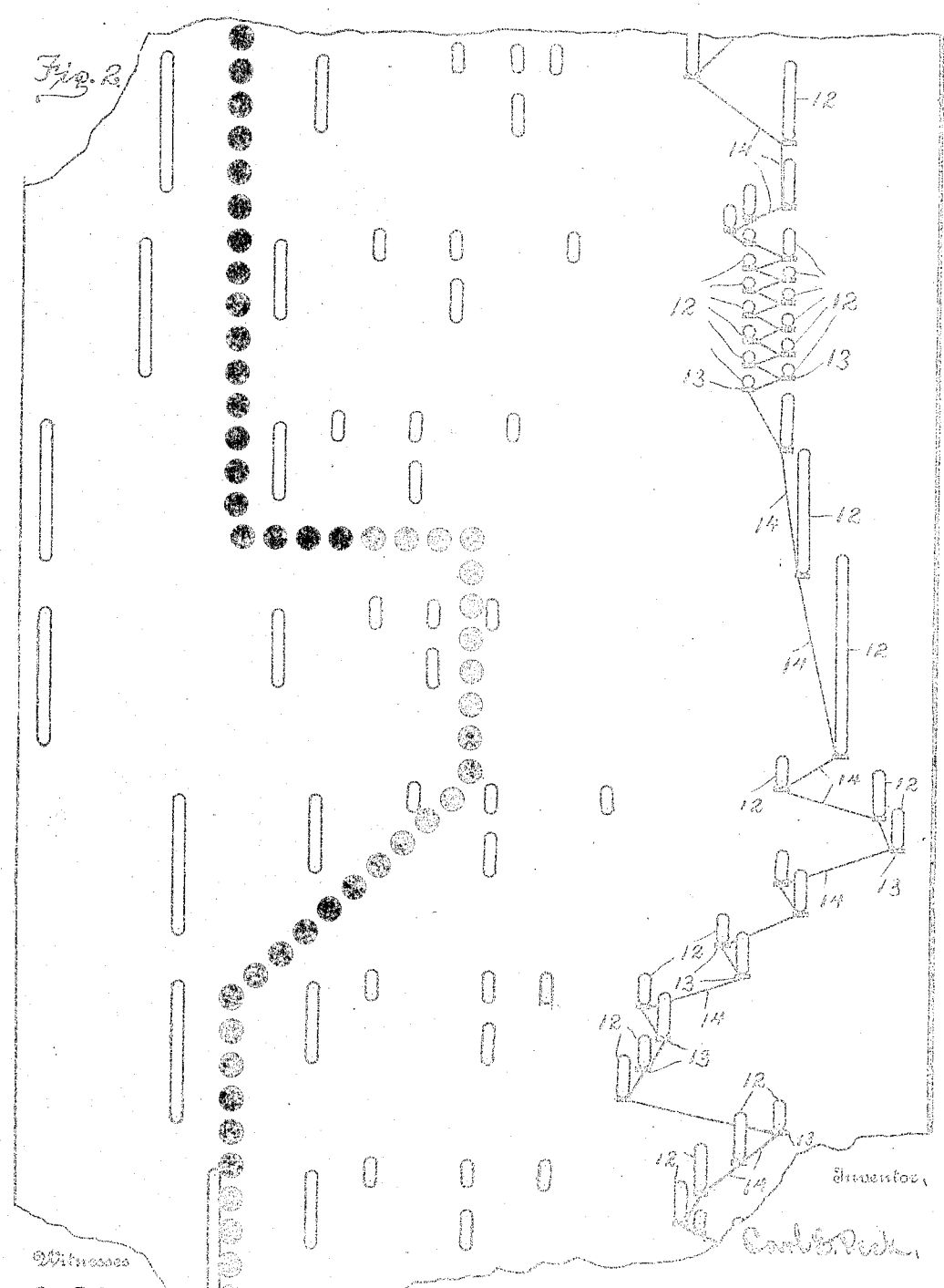

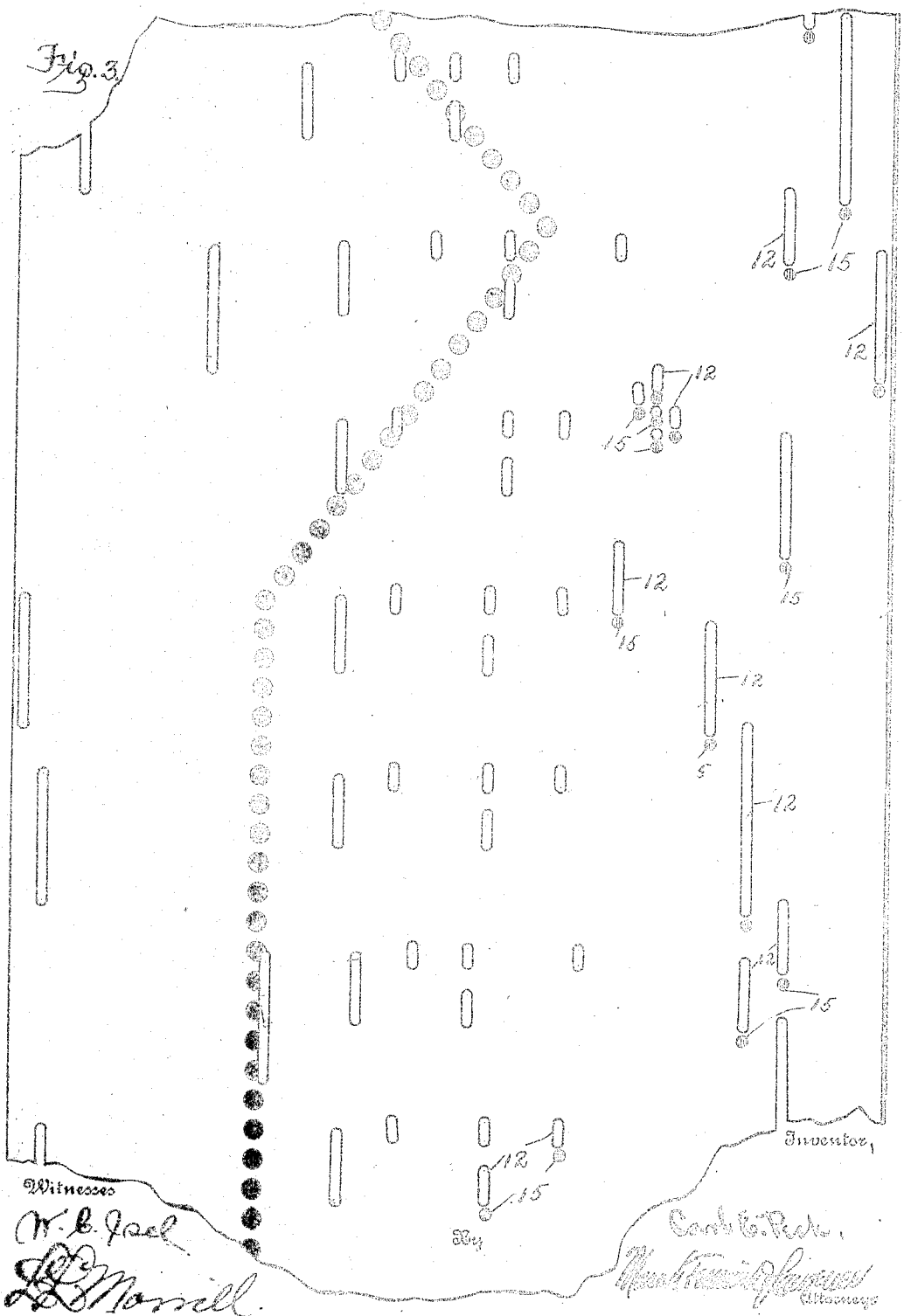

CARL E. PECK, OF NEW YORK, N. Y.

MUSIC-SHEET.

No. 881,337.  Specification of Letters Patent.  Patented March 10, 1908.

Application filed July 13, 1907. Serial No. 383,676.

*To all whom it may concern:*

Be it known that I, CARL E. PECK, a citizen of the United States, residing at New York, in the county of New York and State of New York, have invented certain new and useful Improvements in Music-Sheets; and I do hereby declare the following to be a full, clear, and exact description of the invention, such as will enable others skilled in the art to which it appertains to make and use the same.

This invention relates to music sheets for piano players, self-playing pianos and the like, and has for an object to provide a sheet upon which the theme or melody is marked in such manner that it may be followed by the operator.

A further object of the invention is to provide in a music sheet having the usual and ordinary openings therein, of designations properly positioned relative to the holes representing the theme or melody, so that such holes are easily distinguishable by the operator.

A further object of the invention is to provide in a music sheet having the usual and ordinary holes or openings therein, of designations disposed at the forward end of the openings and properly proportioned and colored to be easily distinguishable and readily recognizable by the operator.

A further object of the invention is to provide in a music sheet having the usual and ordinary holes and openings lines joining the holes or openings representing the theme or melody so that such line may be followed by the eye of the operator.

With these and other objects in view, the invention comprises certain novel constructions, combinations and arrangements of parts, as will be hereinafter fully described and claimed.

In the drawings:—Figure 1 is a view in elevation of a music sheet embodying curved lines ending in acute points adjacent the forward end of the holes representing the theme or melody of the music employed. Fig. 2 is a view of a music sheet having a slightly different embodiment of the marking of the theme or melody comprising marks or dots placed at the forward end of the holes representing the theme and melody with lines preferably straight joining the dots and indicating the theme or melody. Fig. 3 is a view of a sheet wherein the theme or melody is designated simply by the employment of dots or marks at the forward end of the openings.

In the use of a self-playing piano or piano player employing a perforate music sheet, it is found desirable to make it possible for the operator to follow at all times the theme or melody of the music being played for the purpose of accenting, controlling the tempo and for other means of expression.

It is well known that upon the music sheet ordinarily employed a great number of holes or openings are provided resembling each other very closely and with no means for determining from an inspection of the sheet which holes represent the theme or melody and which represent the accompaniment.

In carrying out the invention which forms the subject-matter of this application the sheet is not materially changed from the sheet usually and ordinarily employed, being provided with the usual and ordinary openings adapted and positioned to communicate with the openings of the tracker bar, but the holes or openings representing the theme or melody are so marked that as the sheet passes over the tracker bar, the openings marked and representing the melody are readily distinguishable by the operator.

In Fig. 1 a plurality of curved lines 10 are employed terminating in acute points, as 11, at the forward or lower side of the openings 12, the employment of which produces the melody of the music. As shown in Fig. 1 a melody is provided both in the soprano and base clefs or openings are designated in both clefs which are to be accented manually by the operator to bring out the theme of the music.

In Fig. 2 the openings 12 are designated by means of dots 13 of any convenient, approved and desired size and shape placed at the lower or forward ends of the openings 12 and preferably colored, as represented by the shading in Fig. 2 to clearly distinguish such dots from any other marks which may be upon the sheet.

The dots 13, as above described, are preferably connected by means of lines 14, which may be straight and running from each of the dots representing the melody to the next dot designating the next note of the melody.

As shown in Fig. 3, the openings 12 representing the theme are designated by the employment of dots or marks 15 preferably colored as represented by the drawing to clearly distinguish the said dots from other markings upon the sheet. In the embodiment shown in Fig. 3, the designating dots are not connected, and this form is found sufficient and desirable for a simple melody wherein the openings are not arranged in complicated relation, as shown in the drawing of Fig. 2.

By the employment of either of the embodiments shown in the drawings as the music sheet passes over the tracker bar in front of the operator the eye is guided from one opening to the next which represent the melody by means of the designations, as shown in the drawing, and herein described, and the operator is enabled thereby to properly accent the notes and to employ such other means of expression as is found desirable.

What I claim is:—

1. A traveling music sheet provided with melody openings, and a mark preceding each of the melody openings.

2. A traveling music sheet having melody openings, and marks produced upon the surface of the sheet and preceding each of the melody openings.

3. A traveling music sheet provided with melody openings, a mark preceding each of the melody openings, and lines joining the several marks.

4. A traveling music sheet provided with melody openings, a mark formed upon the surface of the sheet and preceding each of the melody openings, and lines formed upon the music sheet and joining the several marks.

5. A traveling music sheet provided with melody openings, a mark preceding each of the melody openings, and curved lines joining the several marks.

6. A traveling music sheet provided with melody openings, a mark preceding each of the melody openings, and curved lines joining the several marks and forming angles adjacent such marks.

7. A music sheet provided with a sequence of melody openings, and visual means adapted to direct the eye of the operator from one of said openings to the next in series.

In testimony whereof I affix my signature in presence of two witnesses.

CARL E. PECK.

Witnesses:
 HERBERT F. WHITE,
 AUGUST HAGEMEYER.